(12) United States Patent
Swanson et al.

(10) Patent No.: US 11,021,254 B2
(45) Date of Patent: Jun. 1, 2021

(54) MULTI-RAIL GALLEY

(71) Applicant: Textron Aviation Inc., Wichita, KS (US)

(72) Inventors: David James Swanson, Maize, KS (US); Michael Allen Bullard, Wichita, KS (US); Phillip Anthony Kendrick, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 410 days.

(21) Appl. No.: 15/824,309

(22) Filed: Nov. 28, 2017

(65) Prior Publication Data

US 2018/0162532 A1 Jun. 14, 2018

Related U.S. Application Data

(60) Provisional application No. 62/432,854, filed on Dec. 12, 2016.

(51) Int. Cl.
*B64D 11/04* (2006.01)
(52) U.S. Cl.
CPC .................... *B64D 11/04* (2013.01)
(58) Field of Classification Search
CPC ......... B64D 11/04; A47B 77/04; B63B 29/22; B61D 37/006; B61D 37/00
See application file for complete search history.

(56) References Cited

U.S. PATENT DOCUMENTS

| | | | |
|---|---|---|---|
| 4,580,754 A * | 4/1986 | Hughes | A47B 77/04 |
| | | | 248/201 |
| 6,454,208 B1 | 9/2002 | Nervig et al. | |
| 7,514,651 B2 * | 4/2009 | Popeil | A47J 37/042 |
| | | | 219/392 |
| 7,626,142 B2 * | 12/2009 | Backus | A47J 37/041 |
| | | | 219/403 |
| 7,780,114 B2 | 8/2010 | Doebertin et al. | |
| 7,954,761 B2 | 6/2011 | Johnson et al. | |
| 8,319,160 B2 | 11/2012 | Koschberg et al. | |
| 8,322,654 B2 | 12/2012 | Gomes et al. | |
| 8,387,916 B2 | 3/2013 | Baatz et al. | |
| 8,814,087 B2 | 8/2014 | Koschberg et al. | |
| 8,944,376 B2 | 2/2015 | Godecker et al. | |
| 9,254,919 B2 | 2/2016 | Schootstra et al. | |
| 9,382,101 B2 | 7/2016 | Friedrich | |
| 2006/0145002 A1 | 7/2006 | Van Loon | |

(Continued)

*Primary Examiner* — Magdalena Topolski
(74) *Attorney, Agent, or Firm* — Erise IP, P.A.

(57) ABSTRACT

A multi-rail galley includes a countertop on top of a first storage portion, and a second storage portion above the countertop. The countertop includes a first plurality of rails on a top surface that are configured for receiving at least one countertop insert. The second storage portion has a second plurality of rails beneath a bottom surface of the second storage portion and configured for receiving at least one hanging insert. A method of providing a customizable aircraft galley includes providing a countertop above a storage compartment, the countertop having a horizontal surface facing upwards with a plurality of rails disposed on top of the horizontal surface, installing a galley insert onto one of the plurality of rails via a matching slot in the galley insert, and removing the galley insert from one of the plurality of rails, enabling stowage of the galley insert.

19 Claims, 7 Drawing Sheets

(56) References Cited

U.S. PATENT DOCUMENTS

| | | | |
|---|---|---|---|
| 2013/0255656 A1* | 10/2013 | Schootstra | F24C 15/026 |
| | | | 126/190 |
| 2013/0259562 A1 | 10/2013 | Burd | |
| 2014/0368100 A1 | 12/2014 | Burd | |
| 2015/0014481 A1 | 1/2015 | Vandewall et al. | |
| 2017/0341751 A1* | 11/2017 | Heidtmann | B64D 11/0007 |
| 2018/0118349 A1* | 5/2018 | Rowe | B64D 11/0007 |
| 2019/0031348 A1* | 1/2019 | Bajorat | B64D 9/00 |
| 2019/0375508 A1* | 12/2019 | Schalla | B64D 13/08 |

* cited by examiner

MULTI-RAIL GALLEY

CROSS-REFERENCE TO RELATED APPLICATIONS

This application claims the benefit of U.S. Provisional Patent Application Ser. No. 62/432,854 entitled Multi-Rail Galley and filed Dec. 12, 2016, the disclosure of which is herein incorporated by reference in its entirety.

BACKGROUND

1. Field of the Disclosure

Embodiments of this disclosure relate generally to systems for aircraft galleys, and more specifically to systems for interchanging appliances and work surfaces for customizing an aircraft galley.

2. Description of the Related Art

Galleys onboard aircraft may provide appliances for storing and cooking food, as well as open surfaces for preparing food and beverages. Many prior art galleys provide fixed configurations of appliances and open surfaces.

U.S. Pat. No. 8,814,087 to Koschberg et al. discloses a galley compartment with connections that provide electricity, fresh water, and wastewater disposal to two galley appliances and guide rails for mounting the appliances.

U.S. Pat. No. 7,954,761 to Johnson et al. discloses a modular integrated galley used for food preparation and storage that includes a mounting rack with multiple spaces for receiving galley modules.

U.S. Pat. No. 7,780,114 to Doebertin et al. discloses a modular galley for aircraft that includes standardized connection elements and interfaces for receiving interchangeable devices.

SUMMARY

In an embodiment, a multi-rail galley is provided. The multi-rail galley includes a countertop disposed on top of a first storage portion and a second storage portion disposed substantially above the countertop to form an open portion between the countertop and the second storage portion. The galley further includes the countertop having a first plurality of rails disposed on a top surface of the countertop, the first plurality of rails being aligned substantially parallel with one another and configured for receiving at least one countertop insert, and the second storage portion having a second plurality of rails disposed beneath a bottom surface of the second storage portion, the second plurality of rails being aligned substantially parallel with one another and configured for receiving at least one hanging insert.

In another embodiment, a system that provides versatility for configuring a cabin galley is provided. The system includes a rail exposed on a substantially horizontal surface, a galley insert having a slot adapted to securably receive the rail such that the galley insert may be installed via the rail adjacent the substantially horizontal surface, and a locking mechanism for securing the at least one galley insert to the rail.

In yet another embodiment, a method of providing a customizable aircraft galley is provided. The method includes providing a countertop above a storage compartment, the countertop having a horizontal surface facing upwards with a plurality of rails disposed on top of the horizontal surface. The method further includes installing a galley insert onto one of the plurality of rails via a matching slot in the galley insert, and removing the galley insert from one of the plurality of rails, enabling stowage of the galley insert.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Conventionally, most galleys provide fixed configurations of appliances and open surfaces. A portion of a galley may be exchanged, but maintenance personnel are typically required to perform the exchange. What is needed for customizing a galley is a system that provides versatility for configuring and exchanging appliances and open surfaces as desired.

Figure 1:
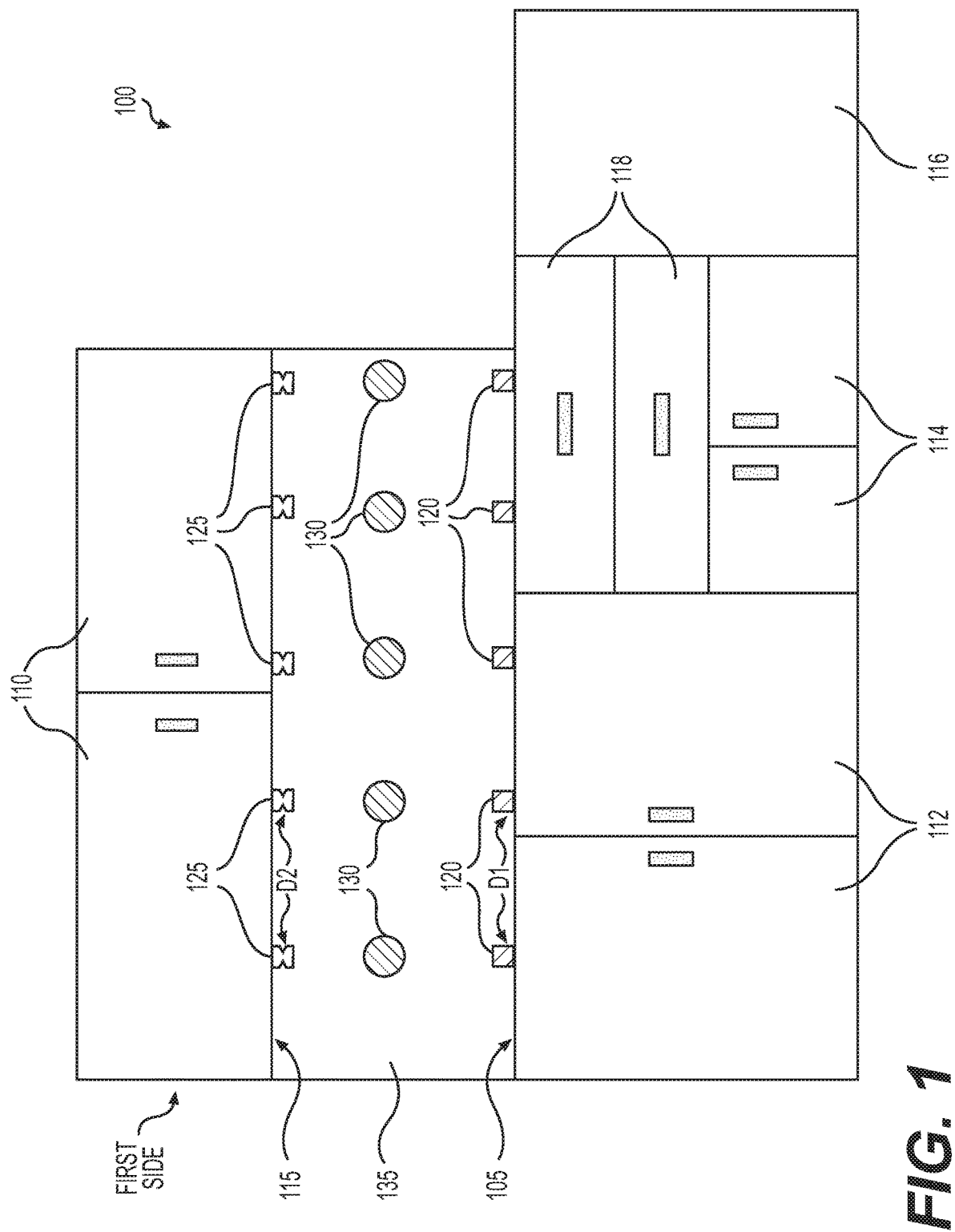
FIG. 1 shows a front view of a multi-rail galley, in an embodiment.
Figure 2:
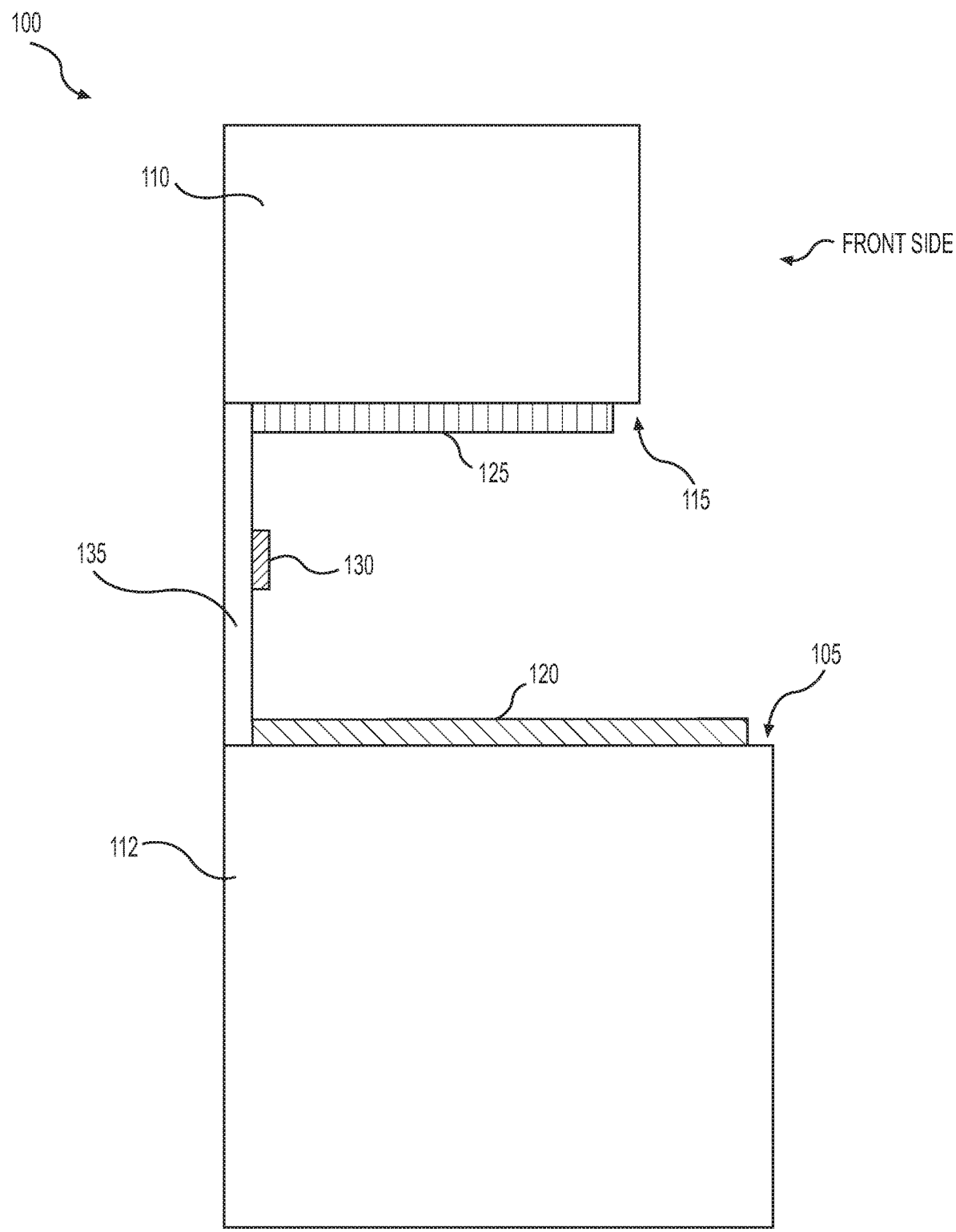
FIG. 2 shows a side view of the multi-rail galley of FIG. 1.

FIG. 1 shows a front view of an exemplary multi-rail galley 100. FIG. 2 shows a side view of multi-rail galley 100 from a first side indicated in FIG. 1. FIGS. 1 and 2 are best viewed together with the following description. Multi-rail galley 100 may include a horizontal surface 105 configured with a plurality of lower rails 120 located thereupon. Lower rails 120 are configured for inserts to be slid and secured onto horizontal surface 105 as described below in connection with FIGS. 3 and 4. The inserts include one or more slots configured to receive a corresponding one or more of lower rails 120, as described below in connection with FIGS. 5B and 5C. The inserts may include, for example, removable storage compartments, appliances, working surfaces, water units, and medical equipment, in any combination.

Removable storage compartments may include cabinets or drawers, boxes or other storage devices (e.g., smart phone docking stations). Example appliances may include, but are not limited to, coffee/espresso makers, microwave ovens, conventional ovens, dish washers, refrigerators, ice makers, beverage makers, beverage chillers, cook tops, and grills. Working surfaces may be any surface conducive to preparing food and beverages, which may include countertops and cutting boards for example. Water units include dispensers for providing cold and/or hot water for beverages. Medical equipment may include an array of devices (e.g., a defibrillator), monitors, and supplies that allow the aircraft to be equipped for providing air medical services.

In certain embodiments, an insert includes an appliance combined with a working surface. For example, a small appliance having a partial footprint of the available space is combined with or located upon a working surface, such as a coffee/espresso maker located on a countertop working surface. Advantageously, multi-rail galley 100 enables a crew member to exchange one or more inserts that provide a full or partial working surface, thereby extending the effective countertop space.

A variety of stationary cabinets may be provided, such as upper cabinets 110 located above horizontal surface 105, as well as lower cabinets 112 and 114 located beneath horizontal surface 105. Cabinets 110, 112, 114, as well as drawers 118, may be configured as storage compartments for storing appliances, medical equipment, and working surfaces. An underside 115 of upper cabinets 110 may include a plurality of upper rails 125 configured for inserts to be secured for hanging, as described below in connection with FIGS. 3, 4, and 5A. An open insert 116 may also be provided to house a large appliance or device, such as a refrigerator, freezer, wine chiller, trash compactor, or medical device, for example.

Lower rails 120 are, in the disclosed embodiment, aligned equidistant from one another by a first distance D1 for accepting countertop storage compartments, appliances, and working surfaces. Similarly, upper rails 125 are preferably aligned equidistant from one another by a second distance D2 for accepting hanging storage compartments and appliances. Alignment of equidistant lower rails 120 by first distance D1 and equidistant upper rails 125 by second distance D2 provides a galley interface that enables exchangeability of removable storage compartments, appliances, medical devices, and working surfaces to enable a variety of galley arrangements. First distance D1 and second distance D2 may be substantially the same or substantially different without departing from the scope hereof. In certain embodiments, each of lower rails 120 is aligned beneath a respective one of upper rails 125, such that a slidably mounted hanging appliance or device may be located directly above a countertop appliance, device, working surface, or removable storage compartment.

A plurality of electrical power connectors 130 may be located along a back wall 135 (as best viewed in FIG. 2) for providing electrical power to appliances. Power connectors 130 may be electrical busses configured in series, such that larger appliances, configured with matching electrical contacts or connectors on the back (see FIG. 6), may bridge more than one of power connectors 130 for providing the necessary electrical power while not overloading the electrical circuit of galley 100. For example, power connectors 130 may each provide twenty-five amps with an option to bridge between more than one connector to provide fifty amps or seventy-five amps to a single appliance. Larger appliances requiring more than twenty-five amps may be configured internally to connect power in series from power connectors 130. In other words, a single appliance may plug into more than one of power connectors 130 (see e.g., FIG. 6 and related description below). This configuration provides the advantage of enabling a crew member to replace two appliances with a single one that has a higher power requirement (e.g., replacing a coffee maker and a wine chiller with a microwave oven that spans two adjacent power connectors 130). An additional advantage is the lack of a requirement to provide a high power circuit for galley 100 due to the option to bridge more than one connector in series.

Lower rails 120 and upper rails 125, together with power connectors 130, provide a standard interface that allows rapid installation and removal of storage compartments, appliances, medical devices and working surfaces within a single aircraft, as well as between different aircraft equipped with multi-rail galley 100. Thus, depending on the flight plan and passengers onboard, each aircraft galley may be customized accordingly for every flight.

Figure 3:
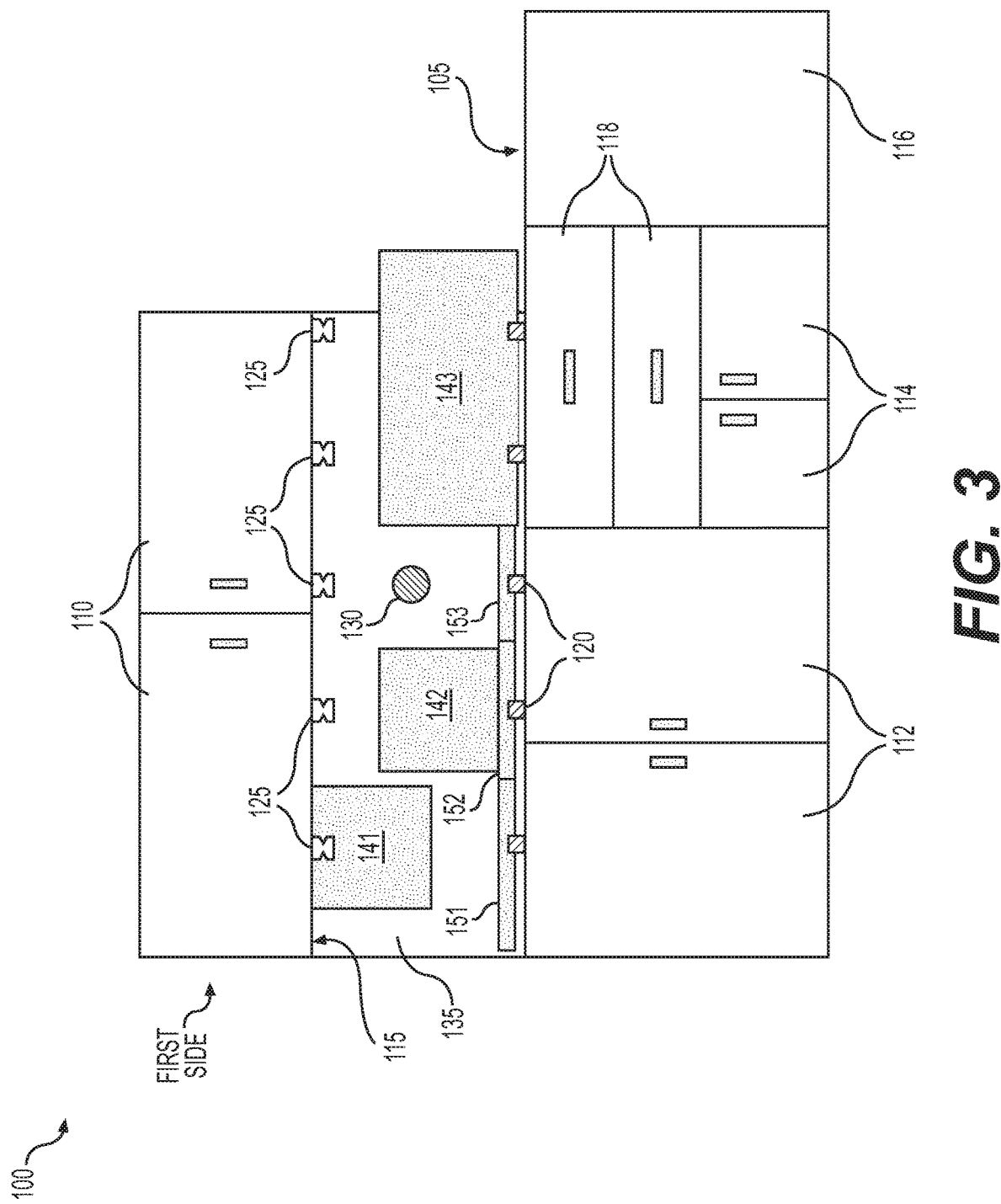
FIG. 3 shows a front view of the multi-rail galley of FIG. 1 configured with appliances and work surfaces, in an embodiment.
Figure 4:
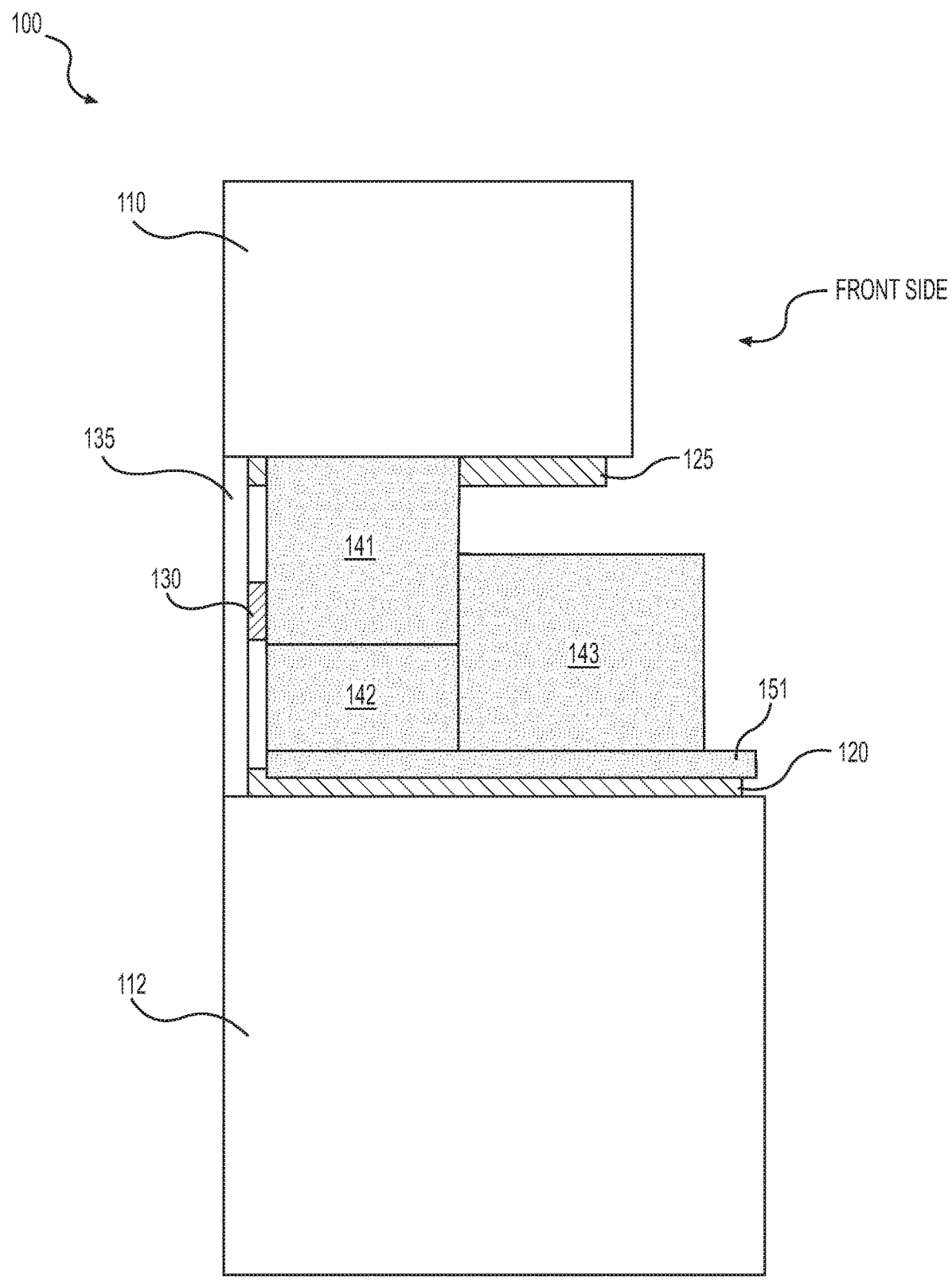
FIG. 4 shows a side view of the multi-rail galley of FIG. 3.
Figure 7:
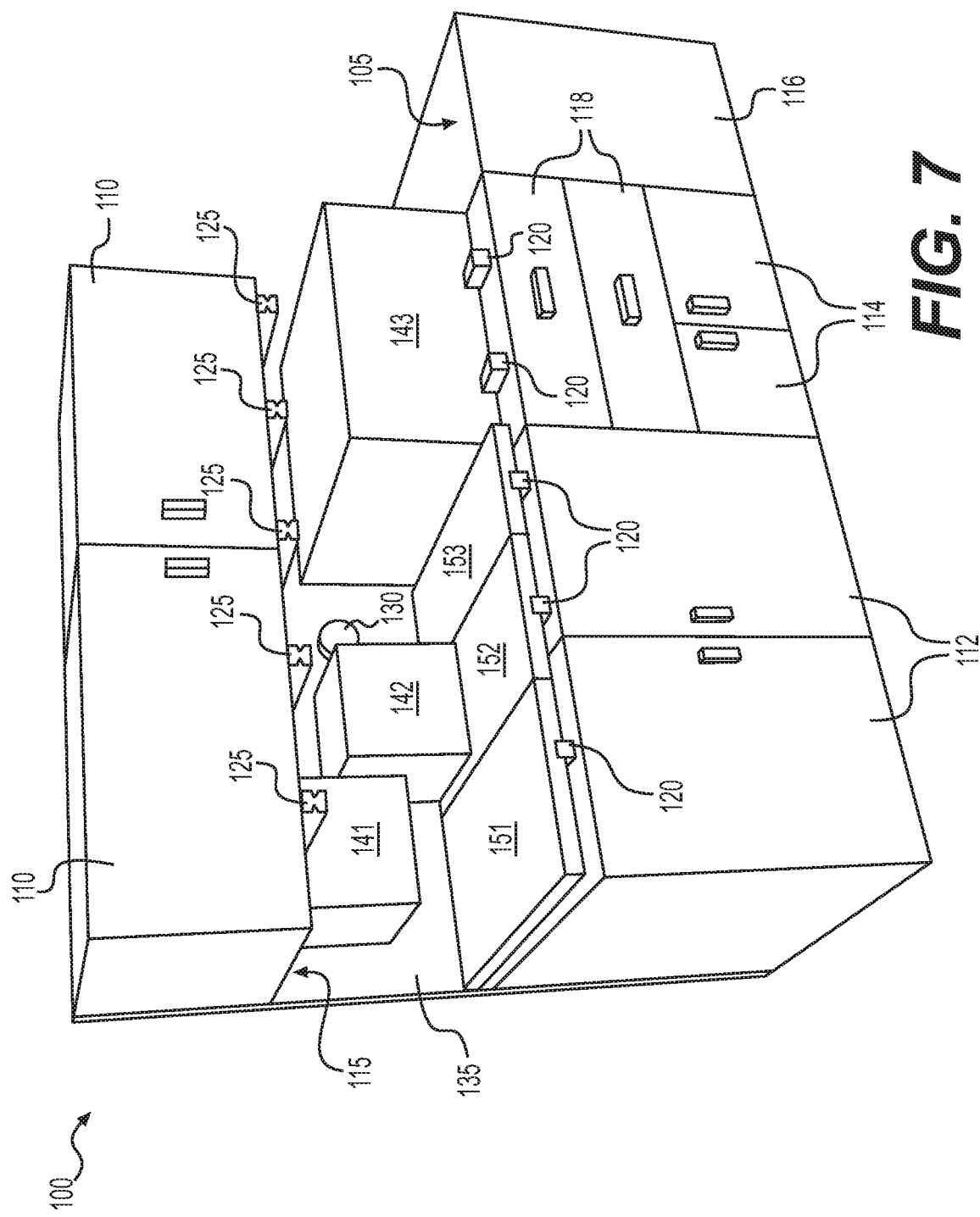
FIG. 7 shows a perspective view of the multi-rail galley of FIG. 3 configured with appliances and working surfaces.

FIG. 3 shows a front view of multi-rail galley 100, FIG. 1 configured with appliances and working surfaces. FIG. 4 shows a side view of multi-rail galley 100 configured with appliances and working surfaces from the first side indicated in FIG. 3. FIG. 7 shows a perspective view of multi-rail galley 100 configured with appliances and working surfaces. FIGS. 3, 4 and 7 are best viewed together with the following description. A first device 141 is configured to accommodate one of upper rails 125 with, for example, a slot 525 in a top surface, as depicted in FIG. 5A. First device 141 is for example a kitchen-type appliance or medical device. As depicted in FIGS. 3 and 4, first device 141 is located on one of upper rails 125 in a hanging configuration. Slots 525 and rails 125 include matching profiles for interconnecting with one another. For example, along inner opposing sides of slot 525 are protrusions extending longitudinally and facing each other. The protrusions are configured to insert into matching V-shaped lateral channels that longitudinally-extend along opposing sides of rails 125 to securely hang an insert, such as first device 141. In this way, an insert may be slid into a hanging configuration along the longitudinal direction of a rail, while the protrusions prevent up or down movement between the rail and the slot.

A second device 142 is configured to accommodate one of lower rails 120 with, for example, a matching slot defined into a bottom surface. Second device 142 is for example a kitchen-type appliance or medical device. As depicted in FIGS. 3 and 4, second device 142 is located on one of lower rails 120 in a countertop configuration. First and second devices 141, 142 are examples of smaller appliances or medical devices requiring power from only one of power connectors 130 and configured in combination with a working surface. For example, first device 141 is located above a first working surface 151, and second device 142 is located in combination with, or behind, a second working surface 152 (see FIG. 5B). Second surface 152 provides a working surface in front of second device 142 for preparation of a food or beverage, for example. In an embodiment, second device 142 is a coffee/espresso maker and second surface 152 is a substantially flat and smooth countertop-type of material. In certain embodiments, second device 142 and second working surface 152 are mechanically coupled together for easy and rapid installment, and removal for storage, via one of rails 120.

A third device 143 is located on two of lower rails 120 and connected to two of power connectors 130. Third device 143 is an example of a larger appliance or medical device that takes up most of the footprint of the countertop leaving little or no room for a working surface. Third device may require electrical power from more than one of power connectors 130 (see FIG. 6), such as a large microwave oven. Electrical power from the more than one power connectors 130 may be bridged together in series.

Figure 5C:
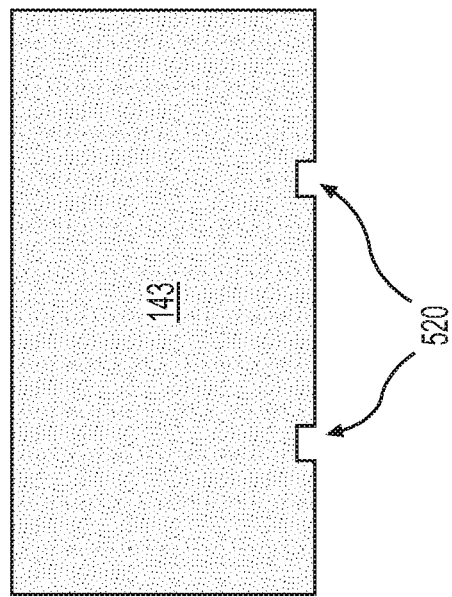
FIGS. 5A, 5B, and 5C show cross-sectional views of embodiments of galley inserts having slots for receiving rails of the multi-rail galley of FIG. 1.
Figure 5B:
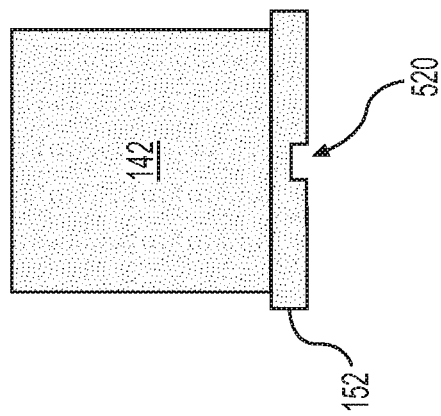
Figure 5A:
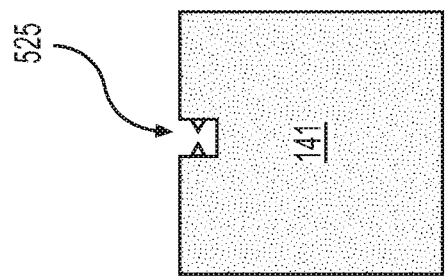

FIGS. 5A, 5B, and 5C show exemplary inserts having slots for receiving rails of the multi-rail galley of FIG. 1. FIG. 5A shows protrusions inside slot 525 for holding hanging insert 141 via matching grooves in upper rails 125 (see FIG. 3). FIGS. 5B and 5C show slots 520, which are configured for receiving a respective lower rail 120. FIG. 5B further shows an example of a galley insert having both a device (e.g., second device 142) and a surface (e.g., second surface 152) in combination. Second device 142 and second surface 152 may be mechanically coupled together for convenient installation and removal. In certain embodiments, lower rails 120 may include grooves extending longitudinally along opposing inner sides (similar to upper rails 125) that are configured to receive corresponding protrusions of slots 520 (similar to slot 525). In other words, slots 520 and lower rails 120 may include matching profiles for interconnecting with one another. In certain embodiments, the location of protrusions and corresponding grooves are swapped such that lower and upper rails 120, 125 include protrusions that correspond with grooves in opposing sides of slots 520, 525.

Figure 6:
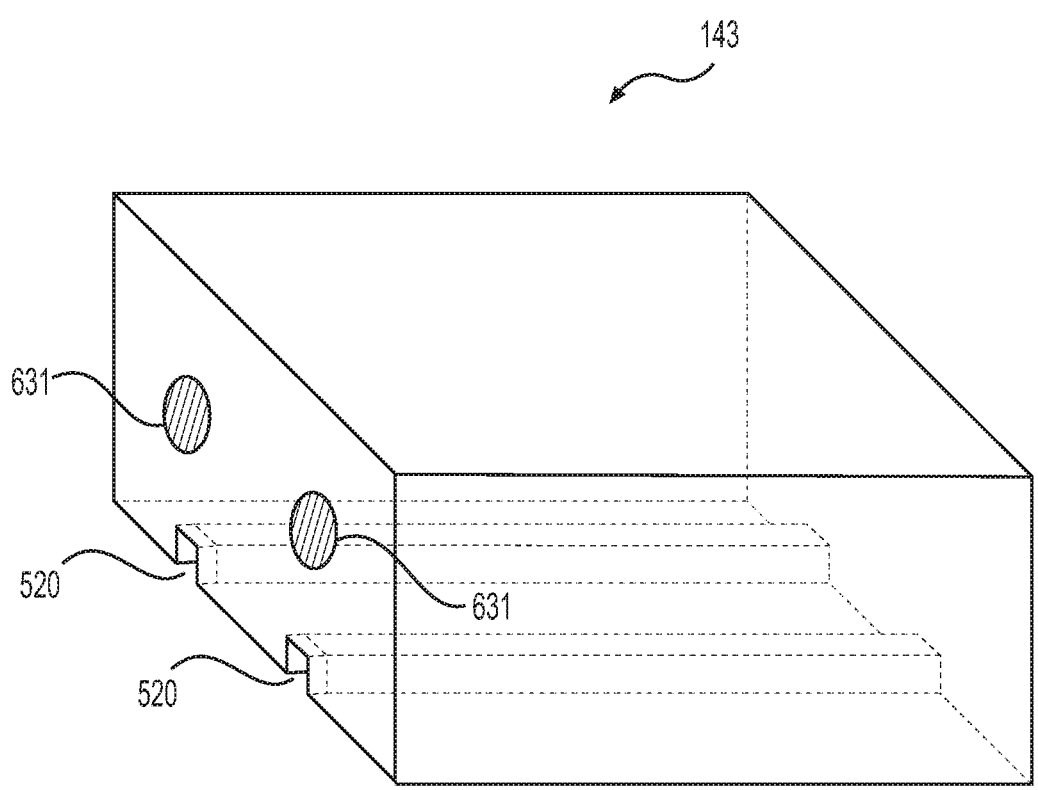
FIG. 6 shows a perspective view of the galley insert of FIG. 5C revealing electrical connectors, in an embodiment.

FIG. 6 shows a perspective view of third device 143 revealing two electrical power connectors 631. Electrical power connectors 631 are compatible with electrical power connectors 130 of multi-rail galley 100 (see FIGS. 1-3). In the embodiment depicted in FIG. 6, third device 143 is configured with two electrical power connectors 631 to receive electrical power from two power connectors 130 bridged together in series.

In operation, a crew member or passenger may locate an insert containing a device, appliance or working surface from a stored location, such as one of cabinets 110, 112, 114, 116 or drawers 118. The insert may be slid onto one of lower rails 120 in a countertop configuration, or if properly configured the insert may be slid onto one of upper rails 125 in a hanging configuration. The insert may then be locked in place along the rail via a latch, a lever lock, or a magnetic lock, for example. Alternatively, the rail may include notches configured to receive a pin mechanically coupled to the insert. The pin may be a releasable, spring-loaded pin, for example.

Once the insert is fully slid into place abutting the back surface 135, in embodiments, an electrical connection will be made between electrical connectors 130 of multi-rail galley 100 and corresponding electrical connectors 631 on the backside of the insert. Thus, connectors 130 are located such that they correspond with reciprocating electrical connectors 631 (see FIG. 6) existing on the back ends of each of the inserts, if the particular insert is one that requires electrical power. This enables rapid installation and removal of a device requiring electrical power.

After an installed insert is no longer needed, the crew member or passenger may clean and store it, and may optionally replace it with another insert in the same location.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A multi-rail galley, comprising:
   a countertop secured on top of a first storage portion;
   a second storage portion secured substantially above the countertop, thereby forming an open portion between the countertop and the second storage portion;
   the countertop having a first plurality of rails secured on a top surface of the countertop, the first plurality of rails being aligned substantially parallel with one another and each configured for receiving at least one countertop insert;
   a plurality of countertop inserts installed on the countertop via the first plurality of rails; and
   the second storage portion having a second plurality of rails secured beneath a bottom surface of the second storage portion, the second plurality of rails being aligned substantially parallel with one another and each configured for receiving at least one hanging insert.

2. The multi-rail galley of claim 1, wherein the first plurality of rails are spaced substantially equidistant from one another by a first distance, and the second plurality of rails are spaced substantially equidistant from one another by a second distance.

3. The multi-rail galley of claim 2, wherein the first distance is substantially equivalent to the second distance.

4. The multi-rail galley of claim 1, wherein the plurality of countertop inserts are selected from the following: appliances, storage compartments, medical devices, and working surfaces.

5. The multi-rail galley of claim 1, wherein the plurality of hanging inserts are selected from the following: appliances, storage compartments, and medical devices.

6. The multi-rail galley of claim 1, wherein each of the first plurality of rails are aligned beneath a respective one of the second plurality of rails such that the plurality of hanging inserts are each configured for positioning directly above a respective one of the plurality of countertop inserts.

7. The multi-rail galley of claim 1, further comprising a plurality of electrical power connectors positioned along a back wall of the galley above the countertop and adjacent the open portion for providing electrical power to the plurality of countertop inserts and the plurality of hanging inserts.

8. The multi-rail galley of claim 7, wherein the plurality of electrical power connectors are arranged in series such that a single device may bridge electrical power from more than one power connector.

9. The multi-rail galley of claim 1, wherein one of the plurality of countertop inserts includes an appliance combined with a working surface, wherein the appliance and the working surface are installed together on the same one of the first plurality of rails.

10. A system that provides versatility for configuring a cabin galley, the system comprising:
    a first rail secured to a top of a substantially horizontal surface;
    a galley insert having a slot adapted to securably receive the rail such that the galley insert may be installed via the first rail on top of the substantially horizontal surface, wherein the substantially horizontal surface faces upwards; and
    a first locking mechanism for securing the galley insert to the first rail.

11. The system of claim 10, further comprising an upper cabinet located above the substantially horizontal surface, the upper cabinet having a second rail located on an underside of the upper cabinet that faces downwards such that an additional galley insert hangs from the second rail via the slot, the second rail having a second locking mechanism for securing the additional galley insert to the second rail.

12. The system of claim 11, wherein the first rail, the second rail, and at least one power connector provide standard interfaces that enable rapid installation and removal of the galley insert or the additional galley insert for customizing utility of the cabin galley.

13. The system of claim 11, further comprising a storage compartment located beneath the substantially horizontal surface or in the upper cabinet, the storage compartment being configured for stowing the galley insert or the additional galley insert when not in use.

14. The system of claim 11, wherein the at least one galley insert is configured for securing to either the first rail or the second rail, and the first locking mechanism and the second locking mechanism, which secure the at least one galley insert to either the first rail or the second rail, respectively, comprise one or more of a latch, a lever lock, a releasable pin, or a magnetic lock.

15. The system of claim 10, further comprising at least one power connector adapted to provide electrical power to the galley insert.

16. A method of providing a customizable aircraft galley, the method comprising:
 providing a countertop above a storage compartment, the countertop having a horizontal surface facing upwards with a plurality of rails fixed on top of the horizontal surface;
 installing a galley insert onto one of the plurality of rails via a matching slot in the galley insert in a deployed mode; and
 removing the galley insert from one of the plurality of rails, enabling stowage of the galley insert in the storage compartment in a stowed mode.

17. The method of claim 16, further comprising:
 providing an upper horizontal surface, disposed above the countertop, the upper horizontal surface facing downwards with a plurality of rails disposed beneath an underside of the upper horizontal surface;
 hanging the galley insert from one of the plurality of underside rails via a matching slot in the galley insert in the deployed mode; and
 removing the galley insert from one of the plurality of underside rails, enabling stowage of the galley insert in the stowed mode.

18. The method of claim 17, further comprising providing a plurality of electrical power connectors located behind the countertop, above the lower horizontal surface, and below the upper horizontal surface, for providing electrical power to the galley insert in the deployed mode.

19. The method of claim 16, further comprising:
 providing a plurality of galley inserts for enabling customization of the aircraft galley;
 installing at least one of the plurality of galley inserts for use in the deployed mode to provide one or more of a working surface, a kitchen appliance, a medical device, and a temporary storage compartment; and
 in the stowage mode, storing at least one of the plurality of galley inserts when unused.

* * * * *